(12) United States Patent
Blackburn et al.

(10) Patent No.: US 9,410,058 B2
(45) Date of Patent: Aug. 9, 2016

(54) COMPOSITIONS AND METHODS FOR WATER-RESISTANT GYPSUM FIBER PRODUCTS

(71) Applicant: United States Gypsum Company, Chicago, IL (US)

(72) Inventors: David R. Blackburn, Barrington, IL (US); Yufeng Xu, Gurnee, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/604,960

(22) Filed: Jan. 26, 2015

(65) Prior Publication Data

US 2015/0291844 A1 Oct. 15, 2015

Related U.S. Application Data

(60) Provisional application No. 61/977,885, filed on Apr. 10, 2014.

(51) Int. Cl.
*B05D 3/02* (2006.01)
*C09D 183/04* (2006.01)
*C04B 28/14* (2006.01)
(Continued)

(52) U.S. Cl.
CPC ............ *C09D 183/04* (2013.01); *B05D 3/0272* (2013.01); *C04B 11/02* (2013.01); *C04B 28/14* (2013.01); *C04B 41/009* (2013.01); *C04B 41/4927* (2013.01); *C04B 41/64* (2013.01); *C04B 2111/0062* (2013.01); *C04B 2111/00482* (2013.01); *C04B 2111/00629* (2013.01); *C04B 2111/27* (2013.01); *C08K 3/30* (2013.01); *C08K 2003/3045* (2013.01)

(58) Field of Classification Search
CPC ............ B05D 3/0272; C04B 41/4927; C04B 2111/00482; C04B 2111/27
USPC ........................ 264/340, 643, 129; 427/387
See application file for complete search history.

(56) References Cited

U.S. PATENT DOCUMENTS 2,198,775 A 4/1940 Jominy
2,791,511 A 5/1957 Lipkind
(Continued)

FOREIGN PATENT DOCUMENTS

| CN | 102010172 | 4/2011 |
|---|---|---|
| DE | 44 33 864 | 2/1995 |

(Continued)

OTHER PUBLICATIONS

Schildbach, Daniel, "A New Water-Repellent Agent for Gypsum-based Drymix Mortars"; Zement-Kalk-Gips-ZKG International, Bauverlag BV., Getersloh, DE, vol. 67, No. 1, Mar. 1, 2014, pp. 64-71, XP001591813, ISSN: 0949-0205, p. 66, paragraph 3-paragraph 68.

*Primary Examiner* — Timothy Kennedy
(74) *Attorney, Agent, or Firm* — Greer, Burns & Crain, Ltd.; Pradip Sahu; Philip T. Petti

(57) ABSTRACT

A water-resistant gypsum fiber product comprising siloxane and coated with a coating comprising alkali metal organosiliconate is provided. A method of making a gypsum fiber product in which siloxane is cross-linked at the surface of the product is also provided. A fuel-efficient method for making the product and reducing the amount of siloxane dust released is provided as well.

5 Claims, 7 Drawing Sheets

(51) Int. Cl.
*C04B 11/02* (2006.01)
*C04B 41/00* (2006.01)
*C04B 41/49* (2006.01)
*C04B 41/64* (2006.01)
C08K 3/30 (2006.01)
C04B 111/00 (2006.01)
C04B 111/27 (2006.01)

(56) References Cited

U.S. PATENT DOCUMENTS

| | | | |
|---|---|---|---|
| 3,914,476 A | 10/1975 | Nitzsche et al. |
| 4,043,825 A | 8/1977 | Miller et al. |
| 4,371,399 A | 2/1983 | May et al. |
| 4,411,701 A | 10/1983 | Saito et al. |
| 5,624,481 A | 4/1997 | Gerhardinger et al. |
| 5,817,262 A | 10/1998 | Englert |
| 6,268,423 B1 | 7/2001 | Mayer et al. |
| 7,081,275 B2 | 7/2006 | Rautschek et al. |
| 7,294,195 B2 | 11/2007 | Kirkpatrick |
| 7,413,603 B2 | 8/2008 | Miller et al. |
| 2004/0259981 A1 | 12/2004 | Krog |
| 2006/0107876 A1 | 5/2006 | Sandmeyer et al. |
| 2007/0056478 A1 | 3/2007 | Miller et al. |
| 2010/0075166 A1 | 3/2010 | Gilley |
| 2012/0015108 A1 | 1/2012 | Sarrazin et al. |
| 2012/0082858 A1 | 4/2012 | Przybysz |
| 2012/0322904 A1 | 12/2012 | Fisher |
| 2013/0145966 A1 | 6/2013 | Schildbach et al. |
| 2013/0273319 A1 | 10/2013 | Chen et al. |
| 2014/0069301 A1 | 3/2014 | Stepp et al. |

FOREIGN PATENT DOCUMENTS

| | | |
|---|---|---|
| GB | 929375 | 6/1963 |
| RU | 2 305 667 | 9/2007 |
| WO | WO 2012/091688 | 7/2012 |
| WO | WO 2012/145636 | 10/2012 |
| WO | WO 2013/004621 | 1/2013 |
| WO | WO 2013/020173 | 2/2013 |

COMPOSITIONS AND METHODS FOR WATER-RESISTANT GYPSUM FIBER PRODUCTS

CROSS-REFERENCE TO RELATED APPLICATIONS

This application claims the benefit of priority from U.S. Provisional Application 61/977,885 filed on Apr. 10, 2014, the entire disclosure of which is incorporated herein by reference.

FIELD OF THE INVENTION

The invention relates to coated gypsum fiber products comprising siloxane and with improved water resistance, and fuel-efficient methods of manufacturing the products in which the level of siloxane dust during manufacturing is reduced.

BACKGROUND

Fire retardant gypsum panels and other products of many useful shapes can be produced by dehydrating and rehydrating gypsum, also known as calcium sulfate dihydrate or landplaster. Such gypsum products are commonly used in building construction.

As gypsum by itself is not water-resistant, there has been a considerable amount of work on improving water resistance of gypsum products. Hydrocarbons, including wax and asphalt are suggested to reduce water uptake in U.S. Pat. No. 2,198,776. Materials including metallic soaps and silicones have been used as coatings on the surface of a finished gypsum product. However, it is difficult to obtain a coating made of these materials with consistent water resistance.

U.S. Pat. No. 4,411,701 discloses adding alkaline metal alkylsiliconates or phenylsiliconates together with calcium hydroxide or calcium oxide to gypsum in making waterproof gypsum molded products, while U.S. Pat. No. 4,371,399 discloses a water-repellent gypsum mortar comprising certain fatty amines. U.S. Pat. No. 7,294,195 discloses water repellant gypsum compositions comprising a hydroxyl-based cellulose and a siliconate.

Siloxane emulsions can be added to a gypsum slurry and these emulsions are useful for improving water-resistance of a gypsum product. A siloxane emulsion was added to fiberboard gypsum products in U.S. Pat. No. 5,817,262 to Englert. In addition to siloxane emulsions, siloxane dispersions can also be used for improving water-resistance of a gypsum product, as described in U.S. Pat. No. 7,413,603 to Miller.

Adding siloxane to a gypsum slurry improves significantly water resistance of a resulting gypsum product. However, a gypsum product is exposed to high temperatures while drying in a kiln and during this high temperature exposure some of the siloxane inadvertently evaporates from the gypsum product and is converted to silicon oxide, also known as siloxane dust. As siloxane dust accumulates in a kiln, it requires stopping production from time to time to clean the kiln and remove the siloxane dust. A kiln has to be cooled down before it can be cleaned and then reheated again before production of gypsum products can be resumed again. These repetitive cooling/heating cycles lead to losses in fuel and waste of energy. Additionally, the siloxane dust can accumulate on gas burners, hot air nozzles, and other equipment within the kiln system, causing the equipment to operate less efficiently and increasing further fuel costs. The siloxane dust can also accumulate on fans, causing them to become unbalanced, resulting in premature bearing failure and high maintenance costs.

SUMMARY

It is an objective of the present invention to provide a gypsum fiber product having improved water resistance and reduced siloxane evaporation during drying. It is also an objective of the present invention to provide a fuel-efficient method which reduces the amount of siloxane dust generated during production.

One embodiment provides a gypsum fiber product comprising a core and a coating, wherein the core comprises gypsum and siloxane and the coating comprises alkali metal organosiliconate, wherein the core is coated on at least one side with the coating, and wherein at least a portion of siloxane is crosslinked at the surface of the gypsum fiber product.

A further embodiment provides a method of making a water-resistant gypsum fiber product in which a gypsum slurry is prepared with a siloxane emulsion and formed into a filter cake, allowed to set, coated with a coating comprising an alkali metal organosiliconate and siloxane is crosslinked at the surface of the gypsum fiber product during drying in a kiln.

A method for decreasing the amount of siloxane dust generated in a kiln is also provided in which a gypsum slurry is prepared with siloxane and formed into a filter cake which is shaped, allowed to set and is coated with a coating comprising an alkali metal organosiliconate.

DETAILED DESCRIPTION

Figure 1:
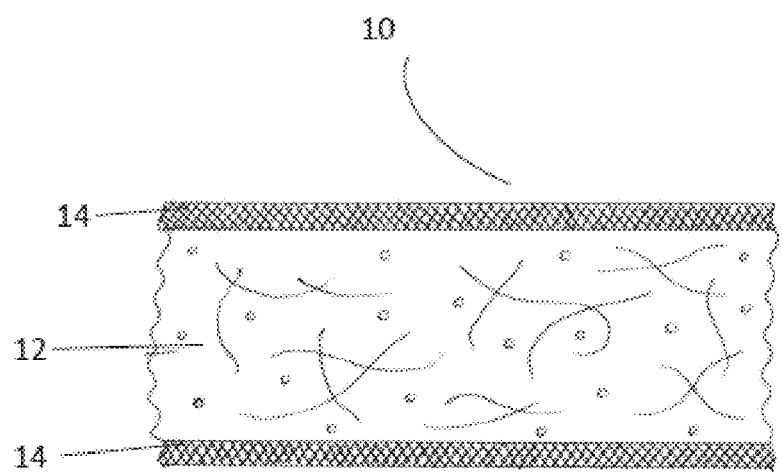
FIG. 1 depicts a cross-section through a portion of a gypsum fiber product.

The present invention provides gypsum fiber products prepared from a pumpable, flowable gypsum slurry comprising siloxane and coated with a coating composition comprising an alkali metal organosiliconate. FIG. 1 is a cross-section of one embodiment in which a gypsum fiber product (10) comprises a gypsum core (12) which is formed from a gypsum slurry comprising siloxane and a coating (14) comprising an alkali metal organosiliconate applied to at least one side of the gypsum core (12). The gypsum core (12) may further comprise other additives, such as wood or paper fibers, organic and inorganic fillers, binders, defoamers, detergents, dispersants, coloring agents and anti-microbial agents. Contemplated gypsum fiber products include, but are not limited to, panels, boards, tiles, ceiling tiles and products of various custom-designed shapes.

At least in some embodiments, an alkali metal organosiliconate is an alkali metal methyl siliconate. In some embodiments an alkali metal is potassium or sodium. At least in some embodiments, a coating comprises potassium methyl siliconate or a combination of potassium methyl siliconate and sodium methyl siliconate. At least in some embodiments, a coating comprises potassium methyl siliconate or a combination of potassium methyl siliconate and sodium methyl siliconate formulated with a hydroxide such as for example, potassium hydroxide. While either a powder or aqueous solution of an alkali metal organosiliconate can be used for making a coating, at least some embodiments utilize preferably an alkali metal organosiliconate formulated as an aqueous solution. A suitable coating can comprise from 0.1% to 10% of an alkali metal organosiliconate by weight of the coating. In some embodiments, a suitable coating can comprise from 1% to 7.5% of an alkali metal organosiliconate by weight of the coating. In further embodiments, a suitable coating can be prepared comprising from 1% to 5% of an alkali metal organosiliconate by weight of the coating. The amount of an alkali metal organosiliconate may vary dependent on the amount of gypsum to be used in a gypsum fiber product. In some embodiments, the amount of an alkali metal organosiliconate is from 0.002% to 2% by weight of the total amount of gypsum.

In some embodiments, a suitable coating is prepared comprising from 0.3% to 10% of potassium methyl siliconate by weight of the coating. In some embodiments, a suitable coating is prepared comprising from 1% to 7.5% of potassium methyl siliconate by weight of the coating. In further embodiments, a suitable coating can be prepared comprising from 1% to 5% of an alkali metal organosiliconate by weight of the coating.

At least in some embodiments, a coating comprising from 1% to 10% by weight of the coating can be prepared from a potassium methyl siliconate stock solution with the solid content of approximately 54% by weight and the active substance content of approximately 34% by weight.

A suitable potassium methyl siliconate stock solution is available under trade name SILRES BS16 from Wacker Chemie AG, Germany. Other suitable commercial stock solutions for potassium methyl siliconate include a potassium methyl siliconate solution available under trade name DOW CORNING 777 from Dow Corning Company, USA. Other suitable siliconates include a mixture of sodium siliconate and potassium siliconate available under trade name BS DRYSOIL from Wacker Chemical Corporation of Adrian, Mich. and a sodium siliconate formulation available under trade name DC 772 from Dow Corning.

A coating can be applied to at least one surface of a gypsum core. At least in some embodiments and as shown in FIG. 1, the coating (14) is applied to both surfaces of the gypsum core (12).

Various siloxane compounds which are capable of forming a polymer/resin, also known as a polysiloxane with general formula $(R_2SiO)_n$, wherein n is a number of times the $R_2SiO$ unit is repeated in a polymer, R can be any organic group, including vinyl $(CH_2)$, methyl $(CH_3)$, and phenyl $(C_6H_5)$, can be used for forming a polymeric matrix in a gypsum fiber product. Suitable organosiloxanes may further include organohydrogensiloxanes which comprise Si-bonded hydrogen. Suitable organohydrogensiloxanes include methylhydrogensiloxane available under trade name SILRES BS 94 from Wacker Chemical Corporation.

A siloxane is preferably added in the form of an emulsion or dispersion to a gypsum slurry. Preferably, a siloxane dispersion is mixed with a gypsum slurry as described in U.S. Pat. No. 7,413,603, incorporated herein by reference. A final concentration for siloxane in a gypsum slurry can be ranging from about 0.08% to about 1%, from about 0.1% to about 0.8% or from about 0.4% to about 0.5%, based on the weight of the gypsum slurry.

Figure 2:
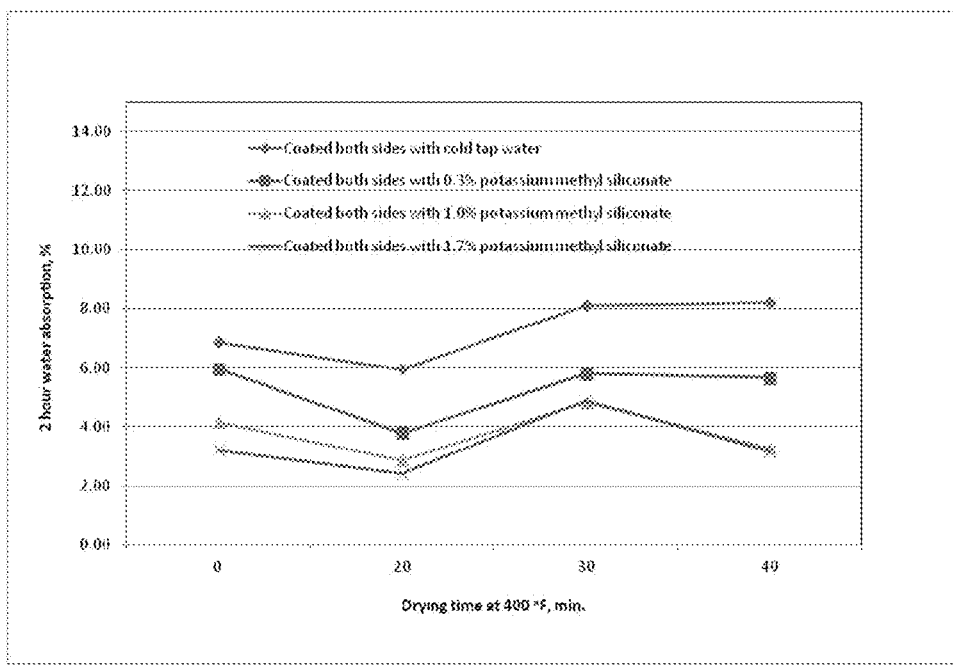
FIG. 2 depicts comparative results of a water repellency test for products coated with an alkali metal organosiliconate.

U.S. Pat. No. 5,624,481 provides that a water-repellent gypsum product can be obtained by impregnating plaster with a mixture of an organosiloxane and alkali metal silicate. Despite this, the inventors have unexpectedly discovered that the resistance to water of a gypsum fiber product can be significantly improved if product's core is made from a gypsum slurry comprising siloxane and the gypsum core is then coated with a coating comprising an alkali metal organosiliconate. FIG. 2 shows results of a water repellency test for a gypsum fiber product in which the gypsum core was made with siloxane, but without an alkali metal organosiliconate. The gypsum core was then coated with a coating comprising 0.3%, 1% or 1.7% potassium methyl siliconate. These coated gypsum fiber products were compared to a gypsum fiber product in which the gypsum core was coated with water in a water-repellency test, results of which are shown in FIG. 2.

The water-repellency test measures the amount of water absorbed by a gypsum fiber product during a two-hour soaking in water. The lower the water uptake, the more water repellant is the product. As shown in FIG. 2, all gypsum fiber products with various coating formulations were dried at 400° F. for 0, 20, 30, or 40 minutes and then dried at 110° F. overnight to complete the drying. The weight of each sample was then measured and all samples were then soaked in water for two hours. The weight for each sample was then measured again and water absorption was calculated and plotted as shown in FIG. 2. As can be seen from FIG. 2, a gypsum fiber product comprising siloxane in its core and coated with a coating comprising potassium methyl siliconate was significantly more water-resistant than a gypsum fiber product with siloxane but without a potassium methyl siliconate coating.

Figure 3:
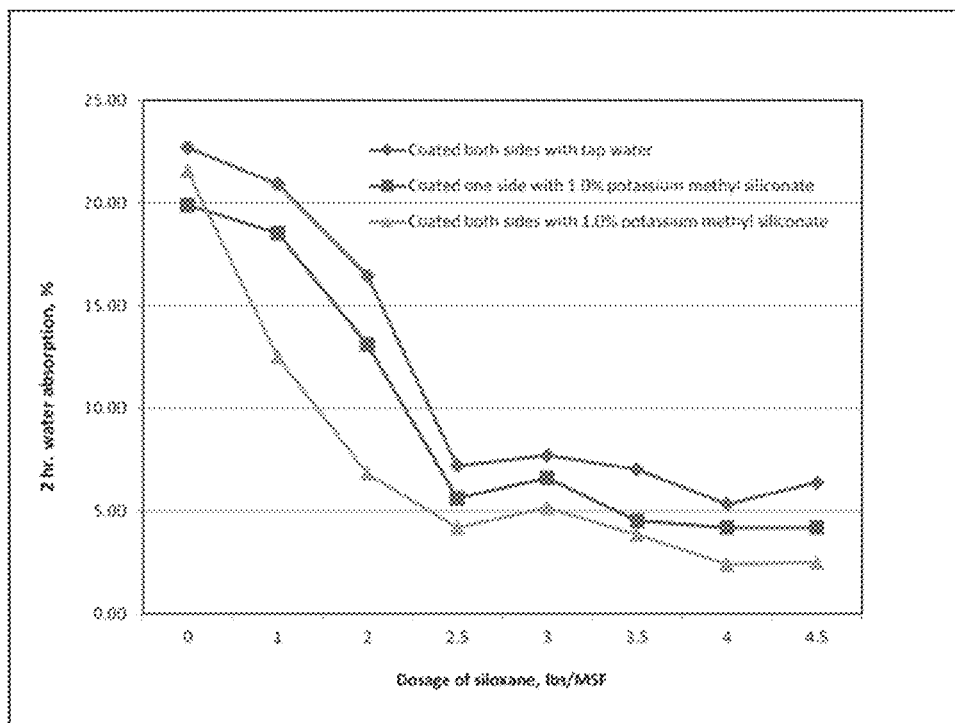
FIG. 3 depicts comparative results of a water repellency test for various amounts of siloxane.

The inventors have also unexpectedly discovered that employing a coating comprising an alkali metal organosiliconate decreases the amount of siloxane needed to be added to the gypsum core in order for a gypsum fiber product to be water resistant. As shown in FIG. 3, gypsum fiber products were made with a gypsum core comprising various dosages of siloxane (from 0 to 4.5 lbs/MSF). The gypsum cores were then coated either on one side or both sides with a coating comprising potassium methyl siliconate. All samples were then dried for 20 minutes at 400° F. and then at 110° F. overnight, including control samples coated with tap water only. All gypsum fiber products were then tested in a water absorption test as described in connection with FIG. 2 and plotted as shown in FIG. 3. As can be seen from FIG. 3, less siloxane was needed to achieve the same water resistance for samples coated with a potassium methyl siliconate coating.

Figure 4:
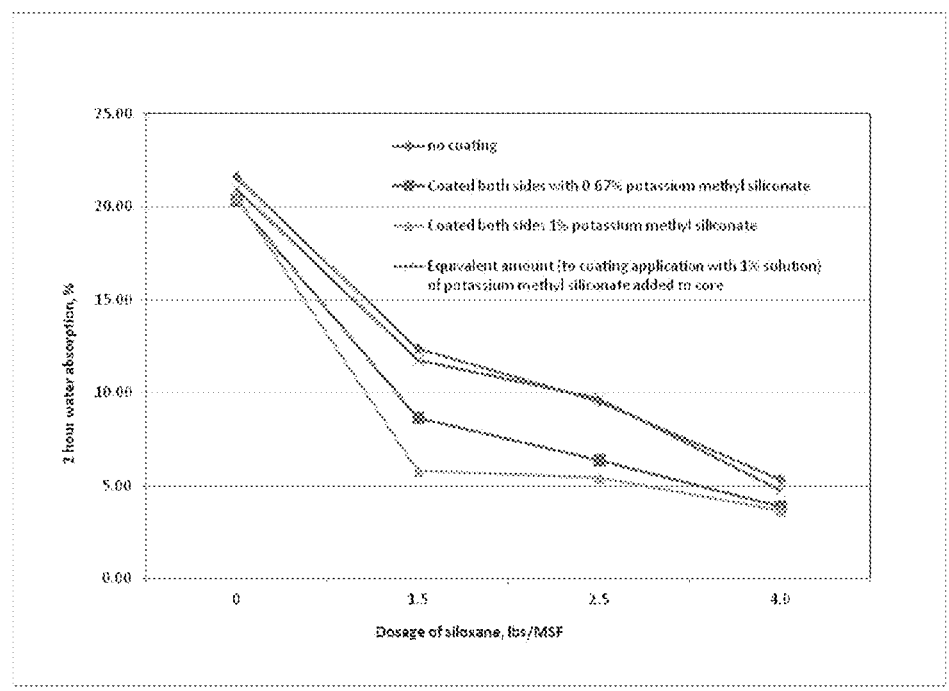
FIG. 4 depicts comparative results of a water repellency test for a gypsum fiber product coated with an alkali metal organosiliconate in comparison to a gypsum fiber product in which an alkali metal organosiliconate is incorporated in the gypsum core.

Surprisingly and as shown in FIG. 4, a much better water resistance can be achieved when an alkali metal organosiliconate is used in a coating in comparison to adding an alkali metal organosiliconate to the gypsum core comprising siloxane. As shown in FIG. 4, gypsum fiber products comprising a gypsum core with siloxane in the range from 0 to 4 lbs/MSF were prepared. In one set of samples, an alkali metal organosiliconate was added directly to the gypsum core. Other samples were either left uncoated or were coated with a coating comprising alkali metal organosiliconate. All samples were subjected to a water-repellency test as described in connection with FIG. 3. As can be seen from FIG. 4, it was unexpectedly discovered that a gypsum fiber product in which an alkali metal organosiliconate was added to the gypsum core was indistinguishable from a control gypsum fiber product in which no alkali metal organosiliconate was added. Unlike products with an alkali metal organosiliconate added directed to the gypsum core, products coated with an alkali metal organosiliconate on both sides showed a significantly improved water resistance. Further, a remarkable reduction in siloxane usage can be achieved without decreasing the water-resistance of a gypsum fiber product if the gypsum fiber product is coated with an alkali metal siliconate coating on both sides.

The inventors have also unexpectedly discovered that using an alkali metal methyl siliconate in a coating on a gypsum fiberboard comprising siloxane decreases significantly evaporation of siloxane and reduces accumulation of siloxane dust in a kiln. This improvement permits manufacturing gypsum fiber products by a fuel-efficient method.

Figure 5:
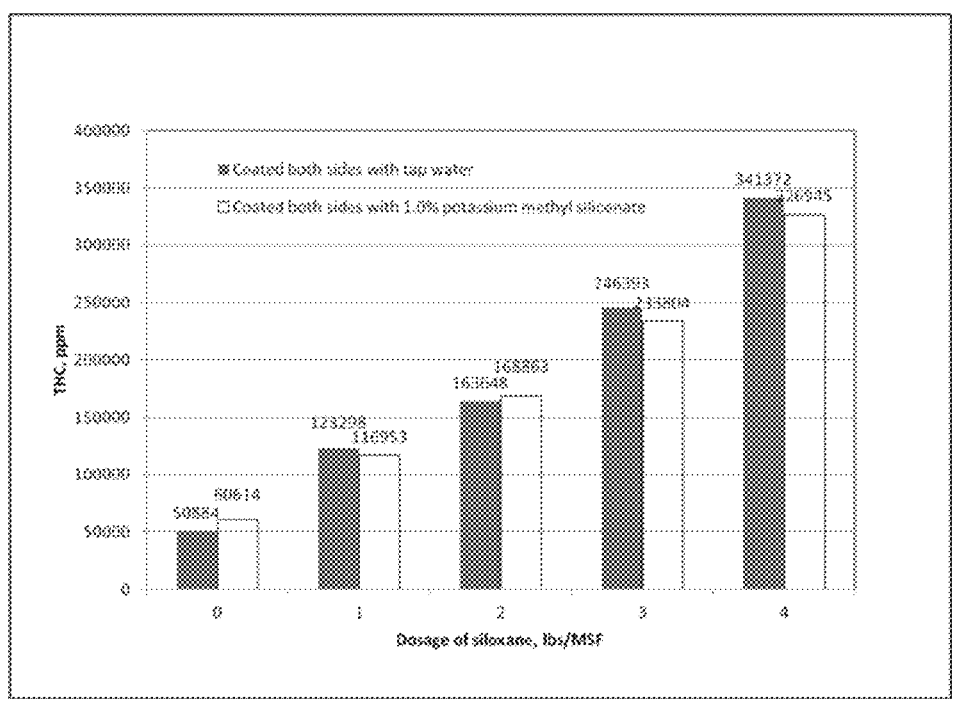
FIG. 5 reports a decreased amount of total hydrocarbon released by a gypsum fiber product comprising siloxane and coated on both sides with a coating comprising an alkali metal organosiliconate.

As shown in FIG. 5, a gypsum fiber product comprising a gypsum core with siloxane and coated with a coating comprising 1% alkali metal organosiliconate produces less total hydrocarbon when exposed to an elevated temperature. Notably, the total hydrocarbon increases when no siloxane is used. The total hydrocarbon decreases with siloxane use of 3 or 4 lbs/msf.

Various methods can be employed for preparing a gypsum fiber product. In some embodiments, a gypsum slurry, optionally comprising further wood or paper fibers, is processed in a pressure vessel at a temperature sufficient to convert the gypsum to calcium sulfate alpha hemihydrate. Following calcining, a siloxane dispersion and other additives are injected into the slurry.

While still hot, the slurry is pumped into a fourdrinier-style headbox that distributes the slurry along the width of the forming area. From the headbox, the slurry is deposited onto a continuous drainage fabric where the bulk of the water is removed and on which a filter cake is formed. As much as 90% of the uncombined water may be removed from the filter cake by the felting conveyor. Dewatering is preferably aided by a vacuum to remove additional water. As much water is preferably removed as practical before the hemihydrate cools and is converted to the dihydrate. The formation of the filter cake and its dewatering are described in U.S. Pat. No. 5,320,677, herein incorporated by reference.

The slurry is compacted and formed into any desired shape. Any forming method can be used, including pressing, casting, molding and the like. As a consequence of the water removal, the filter cake is cooled to a temperature at which rehydration may begin. However, it may still be necessary to provide additional external cooling to bring the temperature low enough to effect the rehydration within an acceptable time.

While the filter cake is still able to be shaped, it is preferably wet-pressed into a board, panel or any other gypsum fiber product of the desired size, shape, density and thickness.

The resulting gypsum fiber product is then coated with a coating comprising an alkali metal organosiliconate.

At least in some embodiments, a gypsum fiber product comprising siloxane is coated with a coating comprising potassium methyl siliconate. A coating may comprise from 0.1% to 10% of potassium methyl siliconate by weight of the coating. A coating may comprise from 1% to 7.5% of potassium methyl siliconate by weight of the coating. A coating may comprise from 1% to 5% of potassium methyl siliconate by weight of the coating. The total amount of potassium methyl siliconate may be from 0.002% to 2% by weight of the total amount of gypsum. A coating may further comprise some additional additives such as for example, an anti-microbial compound.

A gypsum fiber product comprising siloxane can be coated by any method, including flood coating, spray coating, dip coating or roller coating. A coated gypsum fiber product is then sent to a kiln for drying and trimming.

The inventors have discovered that a coating comprising an alkali metal methyl siliconate reduces significantly the amount of siloxane dust generated during drying, which makes this method more fuel-efficient.

It was previously believed that an alkali metal organosiliconate has to be mixed with siloxane in order to initiate cross-linking in siloxane. However, the inventors have discovered that adding an alkali metal organosiliconate directly to a gypsum core comprising siloxane does not significantly improve the water resistance of a gypsum fiber product. Unexpectedly, when a gypsum core comprising siloxane is instead coated with an alkali metal organosiliconate, a significantly less amount of siloxane is needed to achieve the same level of water resistance. This method results in a decrease of siloxane dust and is also fuel-efficient.

Without wishing to be bound by this theory, the inventors believe that when a coating comprising an alkali metal organosiliconate is applied over a gypsum core comprising siloxane, it changes the structure of the resulting product in several beneficial ways. When a coated gypsum fiber product is subjected to drying, a portion of siloxane may migrate from the midst of the gypsum core to its surface. Without the coating, at least some of this siloxane is released as silicone dust during drying. However, when the coating is applied, an alkali metal organosiliconate cross-links siloxane at the product surface. This surface-targeted cross-linking decreases the amount of siloxane dust released during drying.

Catalyzing a fraction of siloxane which is at the surface of a gypsum fiber product not only prevents evaporation of siloxane and reduces accumulation of siloxane dust in a kiln, it also improves water resistance of a gypsum fiber product because more siloxane is now retained and concentrated at the surface of a gypsum fiber product where water resistance is needed the most.

By cross-linking siloxane and keeping it at the surface, a water-resistant gypsum fiber product can be obtained with a lower overall dose of siloxane in part because more of cross-linked siloxane is retained at the surface of a gypsum fiber product.

Figure 6A:
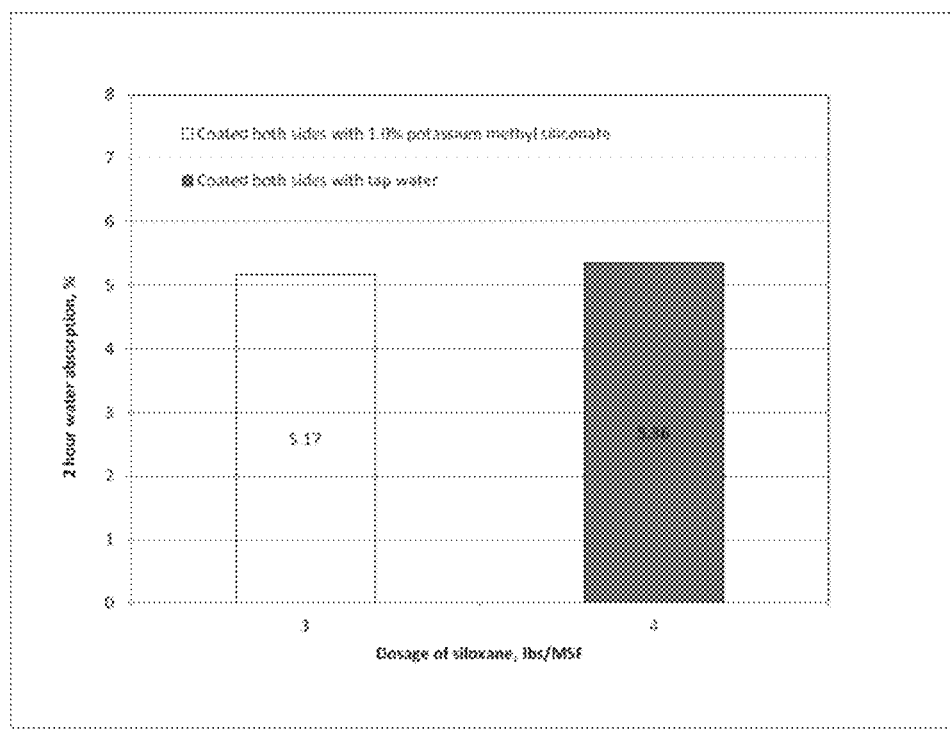
FIG. 6A reports a decreased dosage of siloxane needed to achieve comparable water resistance for a gypsum fiber product coated with a coating comprising an alkali metal organosiliconate.
Figure 6B:
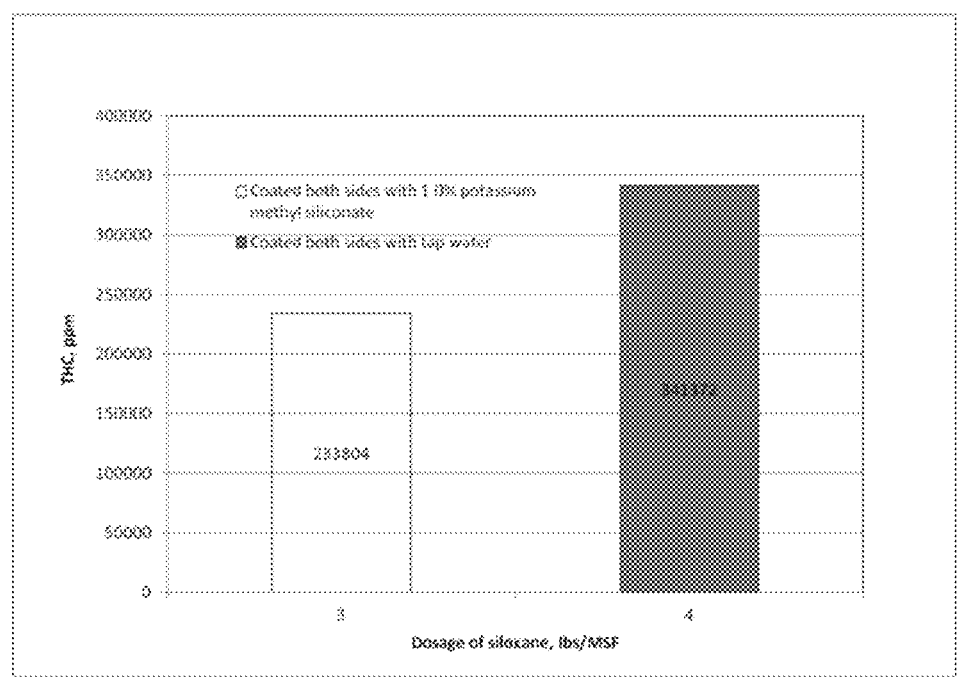
FIG. 6B reports the amount of total hydrocarbon released by gypsum fiber products shown in FIG. 6A.

The inventors have unexpectedly discovered that much less siloxane is needed to achieve the same water resistance for a gypsum fiber product coated with a coating comprising alkali metal organosiliconate. As shown in FIG. 6A, nearly a 25% reduction in the amount of siloxane is achieved for a gypsum fiber product coated with a coating comprising an alkali metal organosiliconate. Importantly and as shown in FIG. 6B, an alkali metal organosiliconate coated product produces significantly less total hydrocarbon when exposed to higher temperatures. The reduction in total hydrocarbon indicates a reduction in evaporation of siloxane and therefore a reduction of siloxane dust.

EXAMPLE 1

In this example, water absorption was tested according to ASTM Standard D 1037. Gypsum board squares (36.8 cm×36.8 cm) were formed from a gypsum slurry comprising siloxane. The samples were then cut into 12.5 cm×12.5 cm squares and coated with cold tap water or a coating comprising 0.3%, 1% or 1.7% potassium methyl siliconate. The coated samples were then first dried at 400° F. for 0, 20, 30, and 40 minutes respectively and then dried at 110° F. overnight to complete the drying. All samples after drying were weighed and these measurements were recorded as the dry weight. The samples were then immersed in water for two hours and weighed to determine the wet weight. The amount of water absorbed in percentage of the dry weight was then calculated and plotted as shown in FIG. 2.

As can be seen from FIG. 2, a coating comprising potassium methyl siliconate improved significantly water resistance of a gypsum sample comprising siloxane.

EXAMPLE 2

In this example, water absorption was tested according to ASTM Standard D 1037. Gypsum board squares (12.5 cm×12.5 cm) were formed from a gypsum slurry comprising various dosages of siloxane (from 0 to 4.5 lbs/MSF). The samples were then coated with cold tap water or a coating comprising 1% potassium methyl siliconate on one side or on both sides. All samples were first dried at 400° F. for 20 minutes and then at 110° F. overnight. All samples were weighed and these measurements were recorded as the dry weight. The samples were then immersed in water for two hours and weighed to determine the wet weight. The amount of water absorbed in percentage of the dry weight was then calculated and plotted as shown in FIG. 3.

As can be seen from FIG. 3, a gypsum fiber board coated on one or both sides with a potassium methyl siliconate coating achieves the same water resistance with a significantly lesser amount of siloxane in comparison to a gypsum fiber board without the coating.

EXAMPLE 3

A comparative test was conducted in which water repellence was compared for a gypsum fiber product in which potassium methyl siliconate was added directly to the gypsum core and a gypsum fiber product which was coated with a coating comprising various amounts of potassium methyl siliconate. Water absorption was tested according to ASTM Standard D 1037. Gypsum board squares (12.5 cm×12.5 cm) were formed from a gypsum slurry comprising various dosages of siloxane (from 0 to 4.0 lbs/MSF). One set of samples was left uncoated and two sets of samples were coated with coating solutions comprising 0.67% and 1.0% potassium methyl siliconate respectively on both sides. In addition, one more set of samples was prepared from a gypsum slurry which comprised various dosage of siloxane (from 0 to 4.0 lbs/MSF), but also comprised 0.5 lbs/MSF of potassium methyl siliconate. The usage of 0.5 lbs/MSF potassium methyl siliconate for internal addition is equal to the actual consumption of potassium methyl siliconate during coating with 1.0% solution.

All samples were dried at 400° F. for 20 minutes and then at 110° F. overnight. All samples were weighed and these measurements were recorded as the dry weight. The samples were then immersed in water for two hours and weighed to determine the wet weight. The amount of water absorbed in percentage of the dry weight was then calculated and plotted as shown in FIG. 4.

As can be seen from FIG. 4, a gypsum board with potassium methyl siliconate added to the gypsum core shows almost no improvement in water resistance in comparison to a gypsum board with the gypsum core in which siloxane alone is used. At the same time, samples coated with a coating on both sides comprising potassium methyl siliconate showed a significant improvement in water resistance in comparison to samples in which potassium methyl siliconate was added to the gypsum core.

Further, remarkable reduction in siloxane usage was achieved without decreasing water resistance for samples coated with a coating comprising potassium methyl siliconate.

EXAMPLE 4

A test was conducted to compare the amount of total hydrocarbon released by a gypsum fiber product with a gypsum core comprising siloxane and coated with a coating comprising potassium methyl siliconate to a gypsum fiber product with a gypsum core, but without the coating. In this test, 12.7 cm×7.62 cm samples were subjected to 450° F. in the Arcadis oven for 40 minutes. The amount of total hydrocarbon emitted from wet samples was measured. As can be seen in FIG. 5, the amount of total hydrocarbon released was decreased in samples containing beneficial amounts of siloxane and coated with a potassium methyl siliconate coating.

EXAMPLE 5

A test was conducted to compare the amount of siloxane needed to achieve a 5% water absorption by a gypsum fiber product coated with a coating comprising 1% potassium methyl siliconate in comparison to a gypsum fiber product coated with tap water. In this test, data generated in water repellency tests of examples 1-3 was analyzed and plotted as shown in FIG. 6A. A 25% reduction in the amount of siloxane needed to achieve a 5% water absorption was observed for a gypsum fiber product coated on both sides with a coating comprising potassium methyl siliconate.

A test was then conducted by analyzing the data obtained in Example 4 to compare the amount of total hydrocarbon released by gypsum fiber products of FIG. 6A. As can be seen in FIG. 6B, the amount of total hydrocarbon released was decreased in a gypsum fiber product coated with a potassium methyl siliconate coating.

What is claimed is:

1. A method for decreasing the amount of siloxane dust generated in a kiln, the method comprising:
    preparing a gypsum slurry comprising calcium sulfate dihydrate;
    heating the slurry under pressure to calcine the calcium sulfate dihydrate to form alpha-calcined calcium sulfate hemihydrate;
    relieving the pressure;
    after the step of calcining under pressure has been completed and the pressure has been relieved, adding a siloxane dispersion to the slurry;
    dewatering the slurry to form a filter cake;
    forming the cake into a desired shape;
    allowing the cake to set to form a product;
    coating the product with a coating comprising alkali metal organosiliconate;
    placing the coated product in the kiln; and
    thereby decreasing the amount of siloxane dust generated in a kiln.

2. The method of claim 1, wherein the alkali metal organosiliconate is potassium methyl siliconate.

3. The method of claim 1, wherein the siloxane is methylhydrogensiloxane.

4. The method of claim 1, wherein the siloxane is used in amounts of about 0.08% to about 1.0% by weight of the total amount of gypsum.

5. The method of claim 1, wherein the alkali metal organosiliconate is used in the amount from 0.1% to 10% by weight of the coating and from 0.002% to 2% by weight of the total amount of gypsum.

* * * * *